United States Patent
Wijaya

[11] Patent Number: 5,787,729
[45] Date of Patent: Aug. 4, 1998

[54] ACCUMULATOR DEFLECTOR

[75] Inventor: Halim Wijaya, Troy, Mich.

[73] Assignee: Automotive Fluid Systems, Inc., Troy, Mich.

[21] Appl. No.: 868,794

[22] Filed: Jun. 4, 1997

[51] Int. Cl.⁶ .................................................. F25B 43/00
[52] U.S. Cl. .......................... 62/503; 96/206; 210/456; 210/DIG. 6; 210/DIG. 7
[58] Field of Search .......................... 62/503; 96/204, 96/206; 210/456, DIG. 6, DIG. 7

[56] References Cited

U.S. PATENT DOCUMENTS

| | | |
|---|---|---|
| 2,461,342 | 2/1949 | Obreiter, Jr. . |
| 2,504,184 | 4/1950 | Dawson . |
| 3,092,978 | 6/1963 | Lorentzen . |
| 3,488,678 | 1/1970 | Wagner . |
| 4,111,005 | 9/1978 | Livesay . |
| 4,116,649 | 9/1978 | Cullen et al. . |
| 4,194,370 | 3/1980 | Morse .................... 62/503 |
| 4,215,555 | 8/1980 | Cann et al. . |
| 4,354,362 | 10/1982 | Schumacher et al. ............ 62/503 |
| 4,537,045 | 8/1985 | Mayer . |
| 4,651,540 | 3/1987 | Morse .................... 62/503 |
| 4,665,716 | 5/1987 | Cochran . |
| 4,689,969 | 9/1987 | Van Steenburgh, Jr. . |
| 4,757,696 | 7/1988 | Gannaway . |
| 4,768,355 | 9/1988 | Breuhan et al. ................ 62/503 |
| 4,835,986 | 6/1989 | Carlisle, Jr. . |
| 5,076,071 | 12/1991 | Morse . |
| 5,184,479 | 2/1993 | Koberstein et al. . |
| 5,184,480 | 2/1993 | Kolpacke ................... 62/503 |
| 5,233,842 | 8/1993 | Manning et al. . |
| 5,347,817 | 9/1994 | Kim . |
| 5,479,790 | 1/1996 | Bottum, Jr. et al. . |
| 5,507,159 | 4/1996 | Cooksey . |
| 5,596,882 | 1/1997 | Hutchison et al. ............ 62/503 |

*Primary Examiner*—William E. Tapolcai
*Attorney, Agent, or Firm*—VanOphem Meehan & VanOphem, P.C.

[57] ABSTRACT

A baffle or deflector having a cone-shaped baffle. Refrigerant fluid enters through the apex and flows through the deflector toward the inner wall of a vessel in an air-conditioning system. The laminar flow of refrigerant fluid against the inner wall separates the liquid and vapor components of the refrigerant fluid. Radial openings in the deflector allow the outlet tube to pass by the deflector. The amount of refrigerant fluid used in the system can be maximized while the size of the vessel can be minimized.

16 Claims, 5 Drawing Sheets

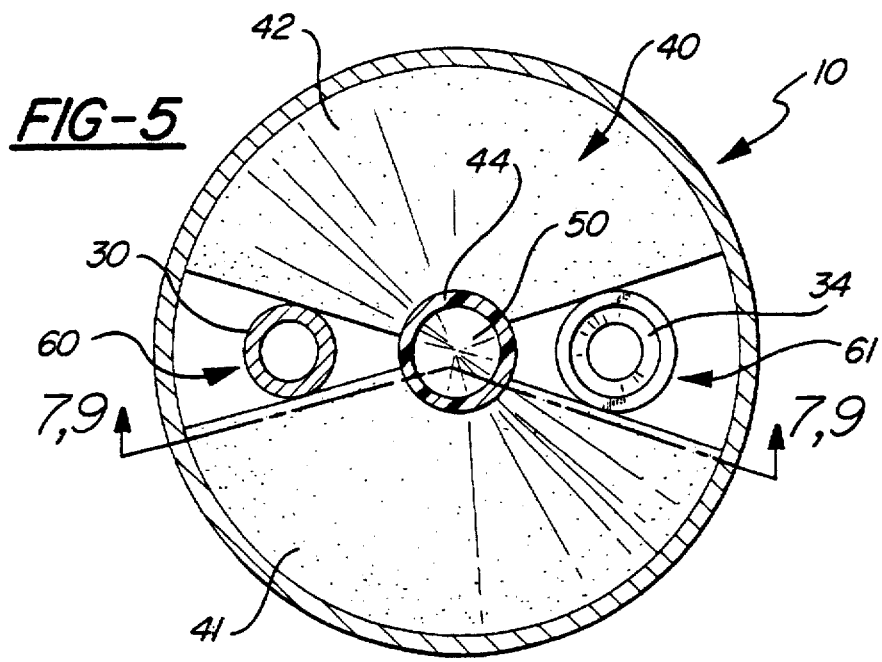
FIG-5
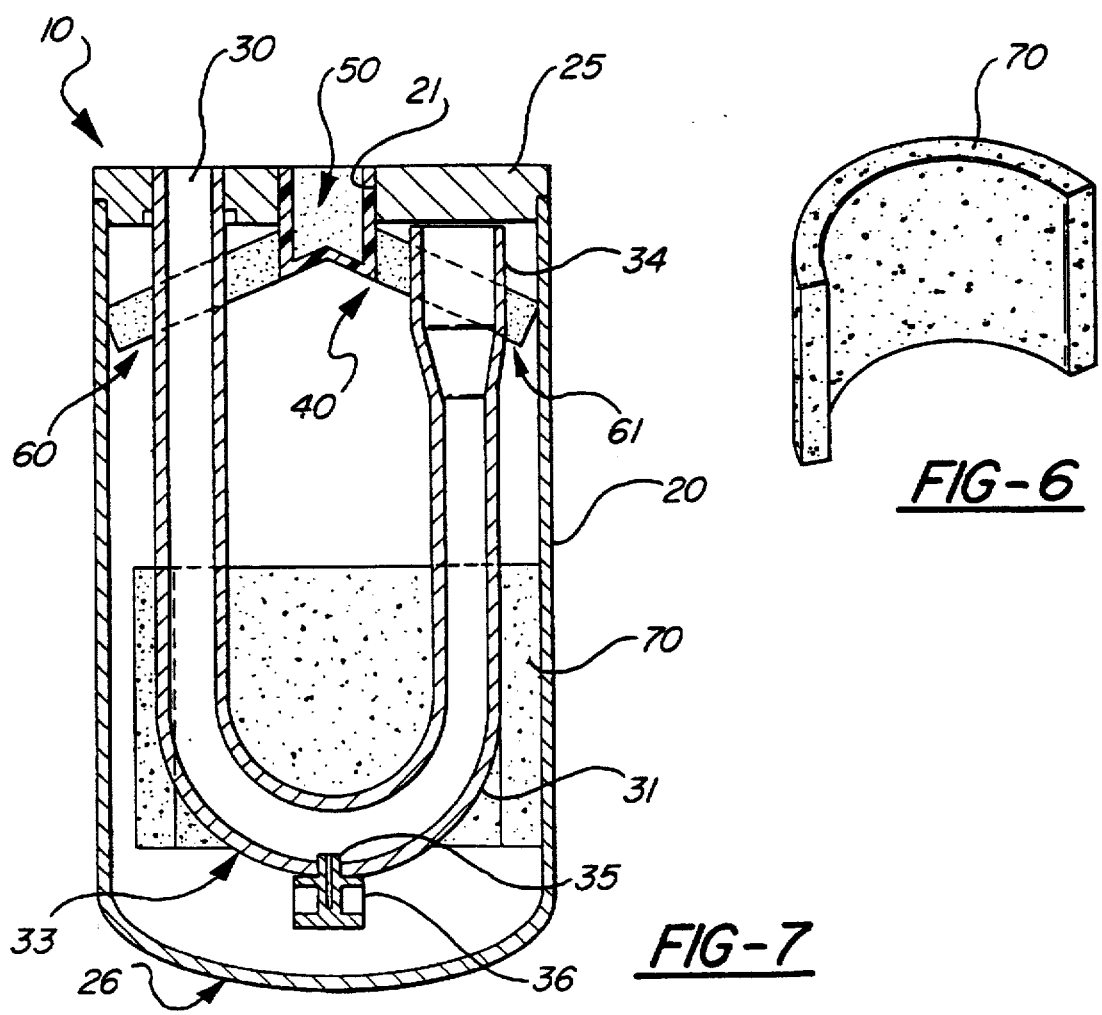
FIG-6
FIG-7

ACCUMULATOR DEFLECTOR

BACKGROUND OF THE INVENTION

1. Field of the Invention

The present invention generally relates to an accumulator for use in an air-conditioning system where the accumulator separates refrigerant fluid into liquid and vapor components. More particularly, the present invention relates to a baffle or deflector for directing the flow of refrigerant fluid within the accumulator and separating the liquid and vapor components of the fluid.

2. Description of the Prior Art

It is a common practice in today's accumulator technology to use a baffle plate or deflector to help ensure that liquid refrigerant fluid does not enter the inlet end of the outlet tube.

U.S. Pat. No. 4,270,934 to Widdowson et al. discloses an inverted cup-shaped baffle located on the inlet end of the outlet tube. The cup-shaped baffle is positioned on the inlet opening toward one side of the accumulator housing. The flow of incoming liquid refrigerant is directed at the cup-shaped baffle where it deflects and flows downward to the bottom of the accumulator housing due to the angle of the sides of the cup-shaped baffle and the force of gravity.

U.S. Pat. No. 4,474,035 to Amin discloses a domed baffle located in an upper region of the accumulator housing adjacent the accumulator inlet opening. The liquid refrigerant fluid enters the accumulator housing through the inlet opening in the top of the housing and is dispersed over the dome of the baffle toward the sides of the housing. This creates a vertical flow down the sides of the accumulator housing. The vapor component of the refrigerant collects in the upper region of the housing beneath the baffle, near the inlet end of an outlet tube. Amin discloses that the inlet end of the outlet tube is located directly below the domed baffle plate. Amin further discloses that a leg of the outlet tube is brazed or welded in a hole in the baffle plate as well as to the top of the accumulator housing.

In addition to the above, other variations of the baffle have been introduced in an attempt to improve flow distribution and component separation. For example, U.S. Pat. No. 4,229,949 to Brandin attempts to improve performance by changing the location of the baffle. Brandin discloses a flow disturbing element formed as a disc with openings arranged perpendicularly to the refrigerant flow path in a kind of pinwheel structure. Turbulence is generated by the openings in the baffle as the refrigerant flows past the baffle. The turbulence causes the mixture of liquid and vapor refrigerant fluid to mix making the liquid separate and fall. The turbulence separates the components of the mixture by altering the geometry of the path of the vapor refrigerant and retarding the speed of the liquid refrigerant component.

Similarly, U.S. Pat. No. 4,651,540 to Morse discloses a baffle plate having a generally swirling shape to carry the liquid refrigerant along a tumultuous path whereby the liquid and vapor components of the refrigerant fluid are separated by centrifugal force.

These prior art designs reflect complex baffles that are relatively expensive to manufacture and difficult to position within the accumulator housing. In addition, none of the prior art baffles provides improved efficiency of the accumulator, outside of merely providing improved separation, such as a reduction in the volume of refrigerant fluid used, and a reduction in the size of the accumulator housing.

What is needed is an accumulator baffle that is easy to manufacture and install that effectively separates the liquid and vapor components of the refrigerant fluid and, at the same time, improves the efficiency of an accumulator while allowing for an increase in design options. Furthermore, there remains a need to develop designs which provide for easier and less costly manufacture of accumulators for use in automobile air-conditioning systems.

Thus, there is still a quest to improve the cost and efficiencies of an accumulator for automotive vehicles. in this regard lighter and smaller components are extremely desirable. The present invention is capable of providing for a reduction in the size of the accumulator, resulting in a reduction in the weight and cost of the accumulator housings.

SUMMARY OF THE INVENTION

The present invention relates to a baffle plate or deflector having a cone-shaped spout and a generally Y-shaped configuration. Refrigerant fluid enters through the apex of the cone-shaped spout and flows through the deflector toward the inner walls of a vessel in an air-conditioning system, at which point the refrigerant fluid flows downward and the vapor component of the refrigerant fluid is separated from the liquid component. Openings in the deflector allow the outlet tube, also sometimes referred to as a U-tube or J-tube, to pass by the deflector. The unique deflector shape creates a laminar flow path for the refrigerant fluid, and allows the inlet end of the U-tube to be positioned above the deflector maximizing the amount of refrigerant fluid that can be used in the system while minimizing the size of the accumulator housing.

It is an object of the present invention to provide a deflector through which refrigerant fluid enters the accumulator housing.

It is a further object of the present invention to direct the flow of refrigerant in a laminar path against the inner walls of the accumulator housing. to facilitate separation of the vapor and liquid components of the refrigerant fluid.

It is yet another object of the present invention to maximize the amount of refrigerant fluid that can be stored in an accumulator.

It is yet another object of the present invention to allow a reduction in the size of conventional accumulator housings.

It is yet a further object of the present invention to improve the efficiency of conventional accumulators.

It is a further object of the present invention to improve the efficiency of manufacturing an accumulator.

BRIEF DESCRIPTION OF THE DRAWINGS

FIG. 5 is a cross-sectional view taken along the line 5—5 in FIG. 4 showing the deflector of the present invention and the outlet tube;

FIG. 6 is a perspective view of a block desiccant material used in conjunction with the present invention;

FIG. 7 is a cross-sectional view taken along line 7—7 in FIG. 5 of an entire accumulator assembly of the present invention including the cone-shaped deflector, outlet and desiccant bricks;

DETAILED DESCRIPTION OF THE PREFERRED EMBODIMENT

Figure 4:
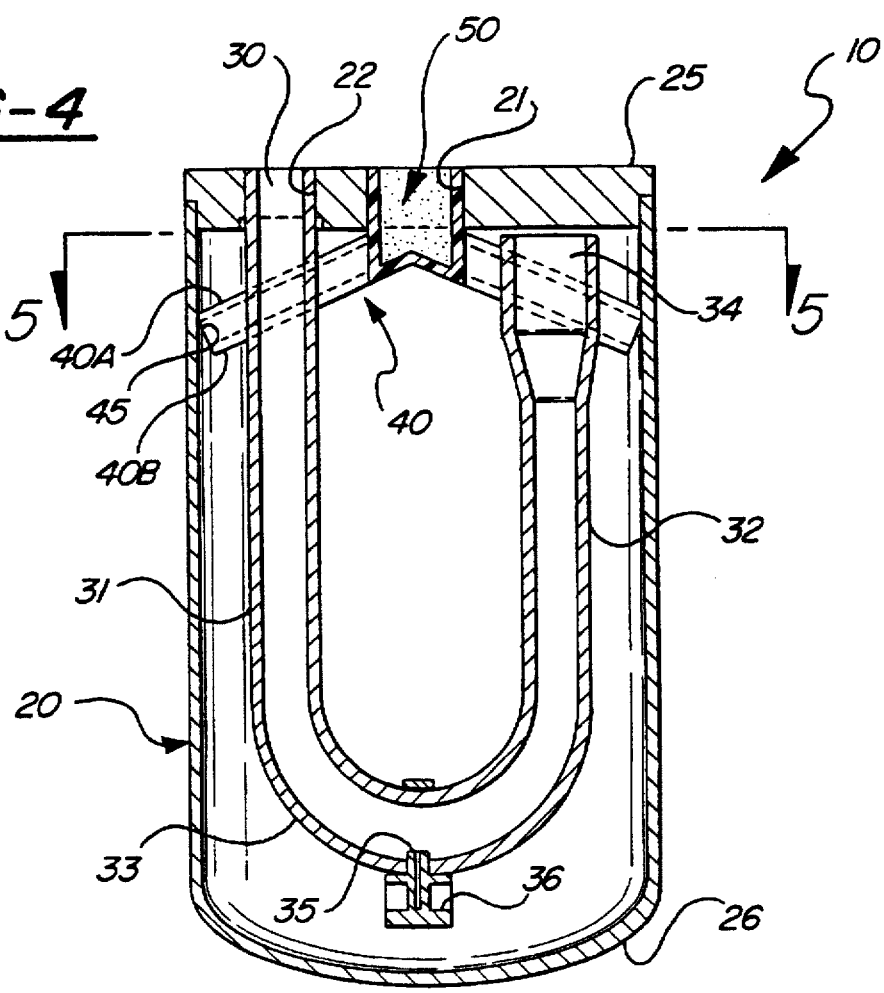
FIG. 4 is a partial cross-sectional view of an accumulator housing showing the deflector of the present invention as it is assembled within the accumulator housing.

With general reference to FIGS. 1 through 7, there is shown an accumulator assembly 10, best shown in FIG. 4, including a generally cylindrical housing 20 that is completely sealed except for an inlet opening 21 and an outlet opening 22 in the top of the housing 20. The housing 20 includes a puck 25 and a can 26 connected to the puck 25 as is well known in the art. The can 26 can be deep drawn as is well known in the art, or it may be molded from plastic or any other suitable material.

The outlet opening 22 accommodates an outlet tube 30, or U-tube, that includes a first leg 31 extending from the outlet opening in the top of the housing 20 to a lower region of the housing 20 wherein a bight portion 33 of the outlet tube 30 is positioned. A second leg 32 of the outlet tube 30 extends upward from the bight portion 33 of the outlet tube 30 to an upper region of the housing 20. An inlet opening or end 34 of the outlet tube 30 is at the end of the second leg 32 and is preferably positioned as close to the puck 25 at the top of the housing 20 as possible. The bight portion 33 of the outlet tube 30 has an oil pick up tube 35 and an oil filter 36.

A baffle 40, or deflector, is located in the upper region of the housing 20 and is a generally cone-shaped spout. One end or apex 44 of the baffle 40 is attached to the inlet opening 21 of the housing 20 and receives the incoming flow of refrigerant fluid. The cone-shaped baffle 40 extends outward from the inlet opening 21 of the housing 20 toward the inner walls of the housing 20 and stops short of contacting the inner walls leaving a space between an opposite end 45 of the baffle 40 and the inner walls of the accumulator housing 20. In one embodiment, shown in FIG. 2, the baffle 40 includes a plurality of spaced apart tabs 43 which preferably contact an inner surface of the can 26 of the housing 20.

The body of the baffle 40 is hollow and creates a passageway or channel 50 for the fluid to flow from the inlet opening, through the deflector, and against the inner walls of the housing 20. The baffle 40 has an upper surface 40A, and a lower surface 40B. A laminar flow path is created that directs the fluid flow to rush against the inner walls of the housing 20. This surface contact causes the liquid and vapor components of the fluid to separate. The vaporous component of the refrigerant fluid rises to the top or upper region of the accumulator housing 20, and the liquid component is directed downward to the lower region of the housing along the inner wall of the housing 20.

Figure 1:
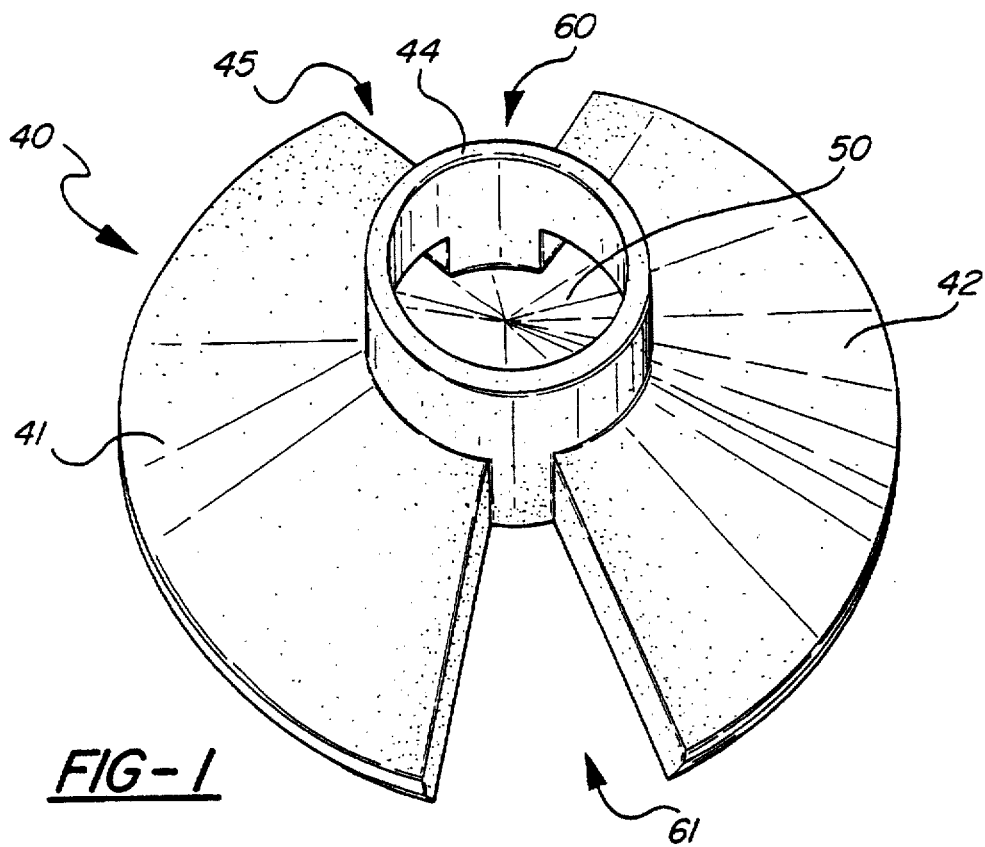
FIG. 1 is a perspective view of the top of a deflector according to the present invention.
Figure 2:
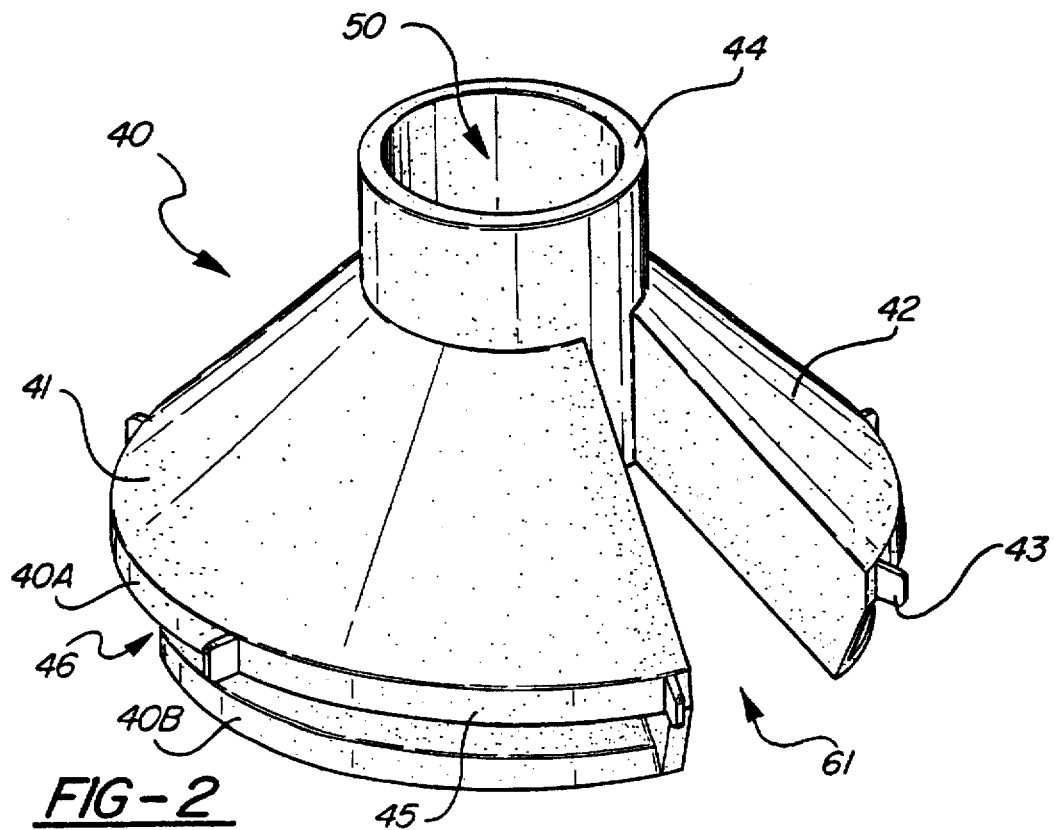
FIG. 2 is a perspective view of the deflector of the present invention.
Figure 3:
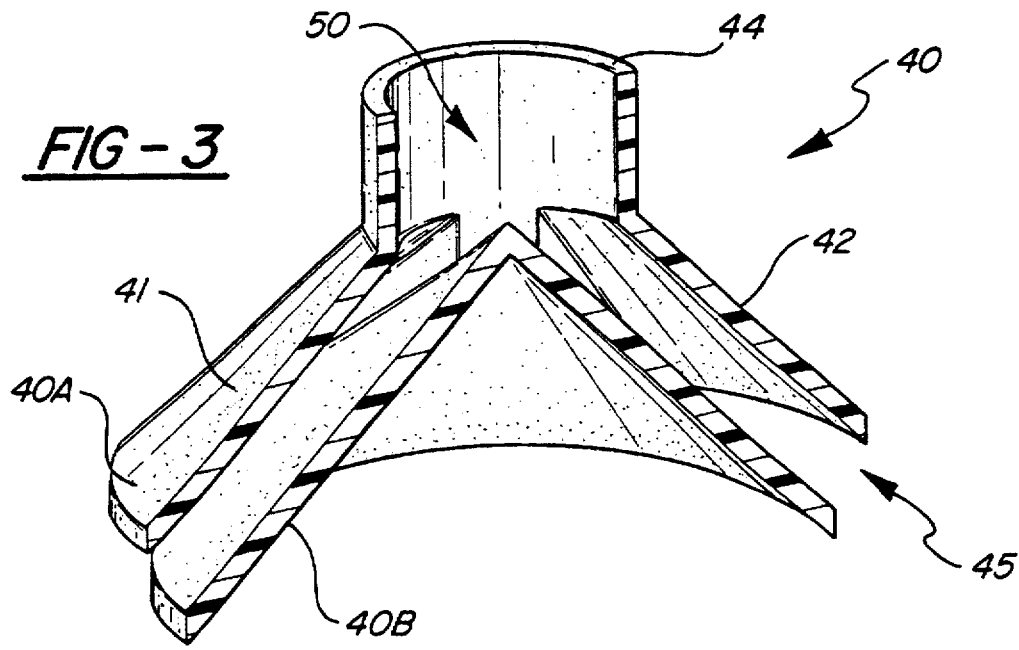
FIG. 3 is a perspective view of the deflector of the present invention, showing the generally cone-shaped channel of the cone-shaped deflector in partial cross section.
Figure 10:
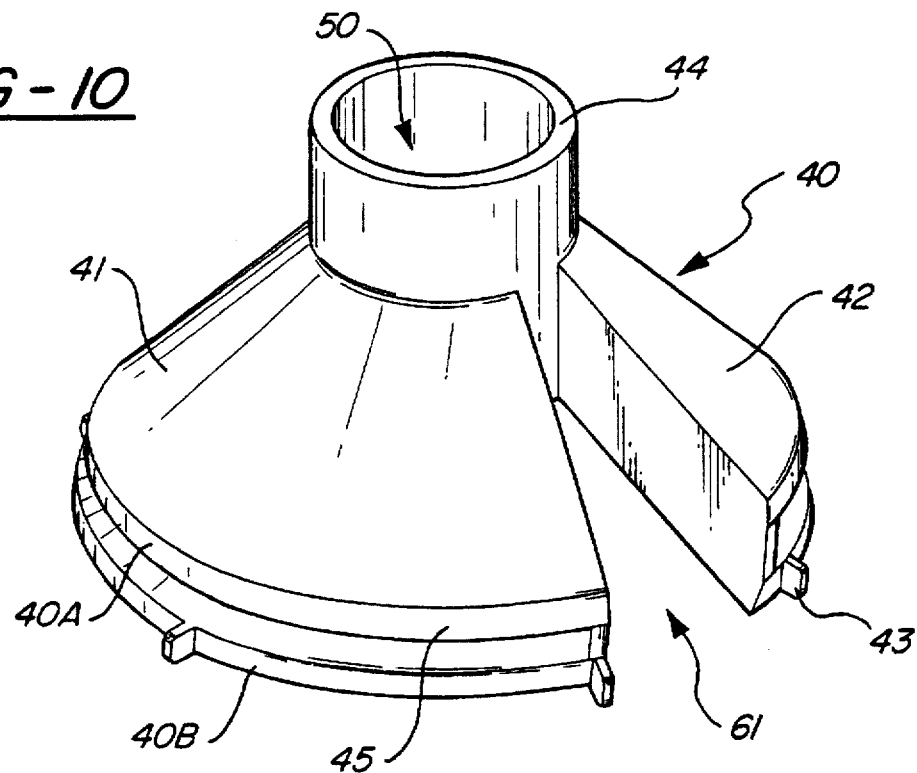
FIG. 10 is a perspective view of the deflector of the present invention wherein the upper wall of the deflector is shorter than the lower wall.

In one embodiment of the present invention as shown in FIGS. 1–5, 1–9, the opposite end 45 of the baffle 40 has an angled surface in which the upper wall 40A is slightly longer than the lower wall 40B creating an overhang or lip 46, as best shown in FIG. 2. In another embodiment of the present invention, shown in FIG. 10, the upper wall 40A is shorter than the lower wall 40B. The flow of refrigerant fluid is the same in both embodiments. The plurality of spaced apart tabs 43 should be placed on the lower wall 40B for the embodiment in which the upper wall 40A is shorter than the lower wall 40B so that the tabs 43 contact the inner surface of the can 26 of the housing 20. In the embodiment in which the upper wall 40A is longer than the lower wall 40B, the plurality of spaced apart tabs 43 can be placed on either the upper wall 40A or lower wall 40B. The tabs 43 are shown on the upper wall 40A in FIG. 2.

An advantage of the laminar flow created by the present invention, is that the deflector 40 directs the flow independent of the volume of refrigerant fluid. In automotive air conditioning systems, the cooling load is constantly changing. It is critical that the system act efficiently independent of the volume of refrigerant fluid flowing at any given time. Prior art accumulator operation is dependent upon the volume of refrigerant fluid flowing in the system. In prior art accumulators, when there is a high volume of refrigerant fluid flowing, the turbulence generated interferes with the effective operation of the accumulator. The present invention works independent of the amount of refrigerant fluid flowing in the system. No matter what the cooling load is, the deflector 40 of the present invention creates the same laminar flow.

The deflector 40 is segmented into a first portion 41 and a second portion 42 by a first vertical passage 60 and a second vertical passage 61 preferably located opposite from the first vertical passage 60. The vertical passages 60 and 61 allow the outlet tube 30 to pass through the deflector 40 without interrupting the fluid flow. The vertical passages 60 and 61 also allow the inlet end 34 of the outlet tube to be located above the deflector 40 as close as possible to the top of the accumulator housing 20.

An advantage of positioning the inlet end 34 of the outlet tube 30 as close as possible to the top of the housing 20 is that only the vapor component of the fluid is allowed to enter the inlet end 34 and, therefore, only vaporous refrigerant fluid is returned to the compressor of the air conditioning system. The refrigerant fluid mixture is dispelled into the housing 20 below the inlet end 34 of the outlet tube 30 eliminating any possibility of splashing or dripping of the liquid refrigerant fluid into the inlet end 34 of the outlet tube 30. Additionally, the flow path created by the channel 50 of the deflector 40 directs the refrigerant fluid away from the inlet end 34 of the outlet tube 30 and toward the lower region of the housing 20.

Another significant advantage of the cone-shaped baffle 40 and outlet tube 30 configuration is that it allows a maximum amount of refrigerant fluid to be stored in the housing without risking overflow into the inlet end of the outlet tube 30. The accumulator 10 of the present invention has been shown to hold up to ¼ lb. of additional fluid for a same size housing if the refrigerant fluid amount is kept constant, a substantial reduction in the size, and therefore weight and cost, of current accumulator designs is attained.

Figure 8:
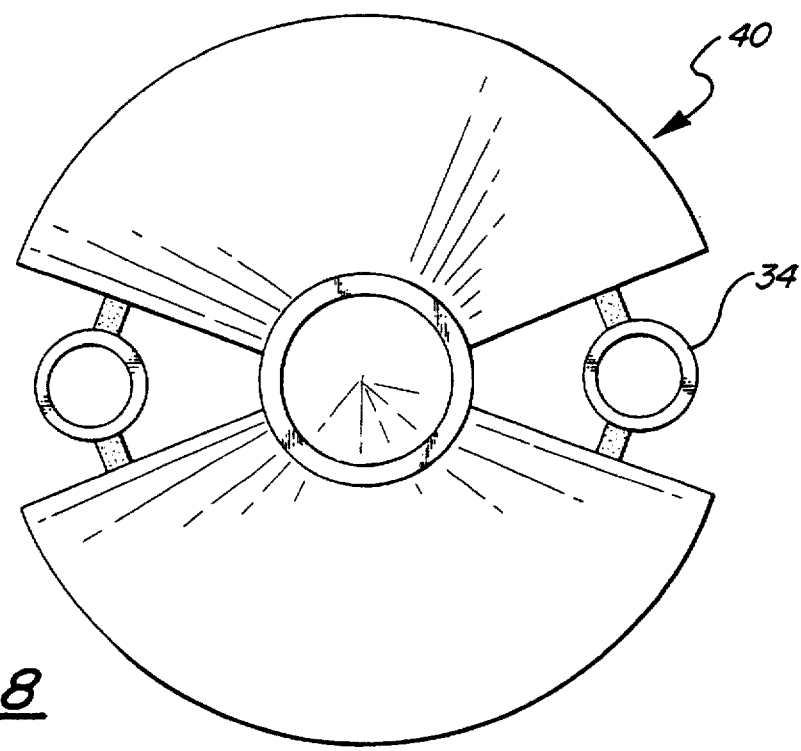
FIG. 8 is a top view of the deflector molded integral with the outlet tube.
Figure 9:
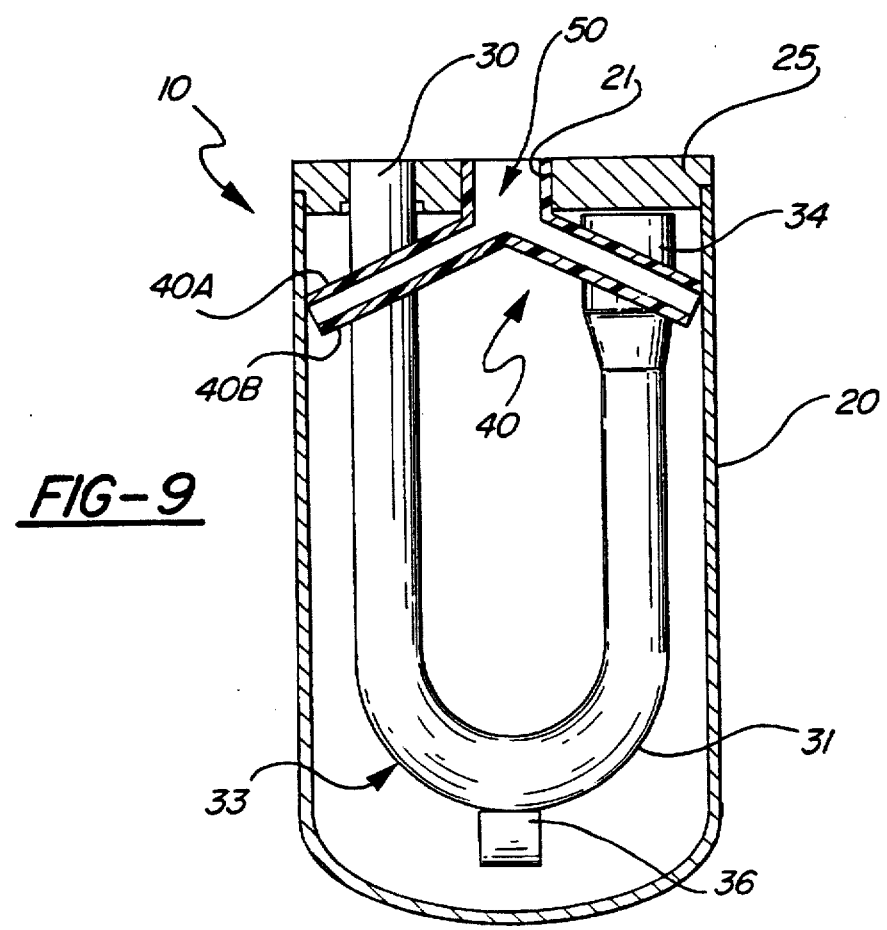
FIG. 9 is a cross-sectional view taken along line 9—9 in FIG. 5 of an entire accumulator assembly of the present invention.

Yet another advantage of the cone-shaped baffle 40 and the outlet tube 30 configuration is that the entire assembly can be molded from plastic. The outlet tube 30 can be an integral part of the deflector 40 as shown in FIG. 8. Prior art deflectors are usually plastic, and the outlet tube aluminum. The present invention allows the outlet tube to be molded of plastic as well, thereby enabling the combination of the deflector and the outlet tube.

The deflector 40 is preferably attached directly to the inlet opening 21 in the puck 25 at the top of the accumulator housing 20 using a staking or other attaching technique. Prior art deflectors are normally tack welded or press fit with an interference to the inner walls of the housing. Some deflectors are even tack welded to, or supported by, the outlet tube. The present invention eliminates the number of weld joints inside the accumulator housing 20, making the accumulator easier and less costly to manufacture than known accumulators.

Figure 11:
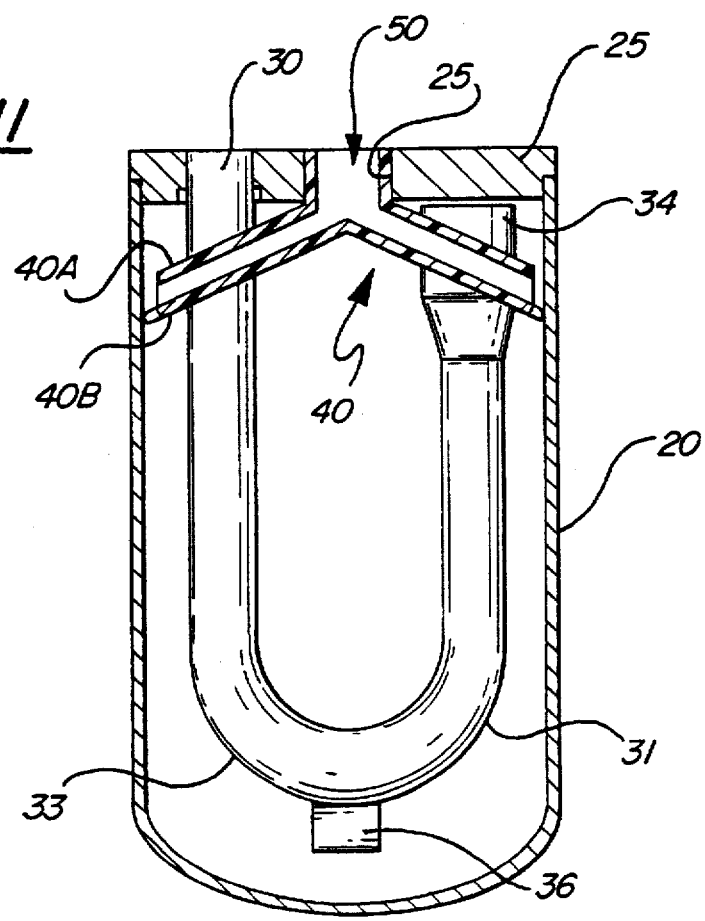
FIG. 11 is a cross-sectional view of an entire accumulator assembly of the present invention including the cone-shaped deflector of FIG. 10.

FIG. 11 shows a cross section of an embodiment of the present invention in which the deflector 40 is held by an interference fit between tabs 43 on the lower surface 40B and the inner surface of the can 26 of the housing 20. The upper wall 40A of the deflector 40 is significantly shorter than the lower wall 40B of the deflector 40A.

A desiccant material in an appropriate amount as known in the prior art is located inside the housing. The desiccant can be in the form of a bag, brick, or other form and held in place with any appropriate means.

In an alternate embodiment, shown in FIG. 7, the accumulator assembly 10 includes two desiccant bricks or blocks 70. The desiccant blocks 70 are preferably arcuate in shape and match the curvature of the inner walls of the accumulator housing 20, as shown in detail in FIG. 6. At least one desiccant block 70 is located between the inner wall of the housing 20 the outlet tube 30. The desiccant block 70 is preferably positioned in the lower region of the housing 20, just above the bottom of the accumulator housing 20 and below the deflector 40. The desiccant block 70 is preferably located directly in the flow path of the refrigerant fluid and the liquid component of the refrigerant fluid passes through the desiccant block 70 optimizing drying. The location of the desiccant blocks 70 and the absence of the usual desiccant bag, reduces the amount of oil usually retained by the desiccant. In prior art accumulators the desiccant bag is touching the bottom of the can. The desiccant bag interferes with the free distribution of oil and even absorbs oil. By locating the desiccant above the bottom of the accumulator can as shown in FIG. 7, the oil is free to drip, improving the efficiency of the accumulator. The location and form of the desiccant will reduce the amount of oil retained by the desiccant, reducing waste and increasing efficiency of the accumulator.

The deflector 40 of the present invention provides a compact, cost-effective, efficient accumulator housing.

The present invention has been described in terms of a preferred embodiment, and it is understood that variations and modifications are possible.

What is claimed is:

1. An accumulator for use in an air-conditioning system, said accumulator comprising:

a housing having an upper region and a lower region;

an inlet tube connected to said accumulator for conveying a flow of refrigerant fluid into said housing;

a deflector disposed in said housing for directing said flow of refrigerant fluid and separating a vapor component of said refrigerant fluid from a liquid component of said refrigerant fluid flow, wherein said deflector comprises:

a spout member having a first end and a second end, said spout member having a first surface and a second surface spaced from and aligned with said first surface said first and second surfaces defining a passageway therebetween said passageway for directing said refrigerant fluid;

at least one radially-aligned passage aligned with and located between said first end and said second end of said spout member;

an outlet tube having an inlet end and an exit end, said inlet end for receiving said vapor component of said refrigerant fluid flow, said outlet tube passing through said at least one radially-aligned passage of said deflector; and a desiccant material located within said housing of said accumulator for drying said refrigerant fluid.

2. An accumulator according to claim 1 wherein said spout member further comprises:

said first surface having a peripheral edge; and said second surface having a peripheral edge, said peripheral edge of said second surface extending further than said peripheral edge of said first surface for creating a laminar flow of said refrigerant fluid.

3. An accumulator according to claim 1 wherein said spout member further comprises:

said first surface having a peripheral edge; and said second surface having a peripheral edge, said peripheral edge of said first surface extending further than said peripheral edge of said second surface for creating a laminar flow of said refrigerant fluid.

4. An accumulator according to claim 1 wherein said desiccant material further comprises a block of solid desiccant material located between said outlet tube and an inner wall of said housing, said refrigerant fluid flowing through said desiccant block.

5. An accumulator according to claim 1 wherein said at least one radially-aligned passage is a first passage, said deflector further comprises a second radially-aligned passage for receiving said inlet end of said outlet tube and wherein said inlet end of said outlet tube is located above said deflector in said upper region of said housing.

6. An accumulator according to claim 1 wherein said housing further comprises:

a can;

a puck attached to said can, said deflector is staked to said puck.

7. An accumulator according to claim 1 wherein said housing further comprises:

a can having interior walls;

said deflector is attached to said interior walls of said can by an interference fit between said spout member and said interior walls of said can.

8. An accumulator according to claim 7 wherein said deflector further comprises a plurality of protruding tabs spaced about an end of said first surface of said spout member and contacting said interior walls of said housing.

9. An accumulator according to claim 6 wherein said can is molded from plastic.

10. An accumulator according to claim 1 wherein said deflector is molded from plastic and said outlet tube is molded as part of said deflector.

11. An accumulator according to claim 9 wherein said can is molded from plastic.

12. An accumulator according to claim 7 wherein said deflector further comprises a plurality of protruding tabs spaced about an end of said second surface of said second spout member and contacting said interior walls of said housing.

13. A deflector for use in a vessel having a housing, an inlet tube, an outlet tube, refrigerant fluid flow, and desiccant, said vessel for use in an air-conditioning system, said deflector comprising:

a spout member having a first end and a second end, said spout member having a first surface and a second surface spaced from and aligned with said first surface, said first and second surfaces defining a passageway therebetween, said passageway for directing said refrigerant fluid flow; and at least one radially aligned passage extending between said first end and said second end of said spout member for receiving said outlet tube.

14. A deflector according to claim 13 wherein said spout member further comprises:

said first surface having a peripheral edge; and said second surface having a peripheral edge, said peripheral edge of said second surface extends further than said peripheral edge of said first surface for creating a laminar flow of said refrigerant fluid.

15. A deflector according to claim 13 wherein said second spout member further comprises:

said first surface having a peripheral edge; and said second surface having a peripheral edge, said peripheral edge of said first surface extends further than said peripheral edge of said second surface for creating a laminar flow of said refrigerant fluid.

16. An accumulator for use in an air-conditioning system, said accumulator comprising:

a housing having an upper region, a lower region and an interior wall;

a puck attached to said housing, said puck having an inlet opening and an outlet opening;

an inlet tube connected to said inlet opening in said puck for conveying a flow of refrigerant fluid to upper and lower regions of said housing;

a deflector disposed in said housing for directing said flow of refrigerant fluid and separating a vapor component of said refrigerant fluid from a liquid component of said refrigerant fluid, wherein said deflector comprises;

a spout member having a first end and a second end, said first end of said spout member attached to said puck, said spout member having a first surface and a second surface spaced from and aligned with said first surface, said first and second surfaces defining a passageway therebetween, said passageway for directing said refrigerant fluid from said first end of said spout member to said second end of said spout member;

a first radially-aligned passage aligned with and located between said first end and said second end of said spout member;

a second radially aligned passage aligned with and located between said first end and said second end of said spout member, said first and second radially-aligned passages dividing said passageway of said spout member into two channels, said two channels communicating at said first end of said spout member;

an outlet tube having an inlet end, an exit end and a bight portion, said outlet tube located within said first and second radially aligned passages of said spout member, said inlet end of said outlet tube being located above said second end of said spout member;

an oil filter attached to said bight portion of said outlet tube; and a desiccant material located in said housing for drying said refrigerant fluid.

* * * * *

UNITED STATES PATENT AND TRADEMARK OFFICE
CERTIFICATE OF CORRECTION

PATENT NO. : 5,787,729  
DATED : August 4, 1998  
INVENTOR(S) : Wijaya

Page 1 of 6

It is certified that error appears in the above-identified patent and that said Letters Patent is hereby corrected as shown below:

Column 1, line 63, kindly delete "provides" and insert ---- provide ----

Column 3, line 6, kindly delete "and"; same line, after "outlet tube;" kindly insert ---- a paragraph indentation ----.

Column 3, line 8, kindly delete the period " . " and insert a semi-colon ---- ; ----.

Column 3, line 11, kindly delete the period " . " and insert ---- ; and ----.

Column 3, line 55, after "upper surface" kindly insert ---- or wall ----; same line, after "40A" kindly delete the comma " , ".

Column 3, line 56, after "lower surface" kindly insert ---- or wall ----.

Column 3, line 65, after "FIGS." kindly delete "1-5,".

Column 4, line 14, after "invention" kindly delete the comma " , ".

Column 4, line 15, kindly delete "air".

Column 4, line 16, kindly delete "conditioning" and insert ---- air-conditioning ----;

UNITED STATES PATENT AND TRADEMARK OFFICE
CERTIFICATE OF CORRECTION

PATENT NO. : 5,787,729
DATED : August 4, 1998
INVENTOR(S) : Wijaya

It is certified that error appears in the above-identified patent and that said Letters Patent is hereby corrected as shown below:

Column 4, lines 32, after "the" second occurrence, kindly insert ---- first and second ----.

Column 4, line33 , after "The" kindly insert ----first and second ----.

Column 4, line 42, kindly delete "air conditioning" and insert ---- air-conditioning ----.

Column 5, line 13, after "fit between" kindly insert ---- the ----.

Column 5, line 16, after "40" second occurrence, kindly delete "A".

Column 5, line 27 after "housing 20" kindly insert ---- and ----.

Column 5, line 62, after "first surface" kindly insert a comma ---- , ----.

Column 5, line 63, after "therebetween" kindly insert a comma ---- , ----.

Column 6, line 10, kindly delete "having" and insert ---- and said second surface of said spout member each have----; same line, kindly delete "; and";

Column 6, line 11, kindly delete "said second surface having a peripheral

UNITED STATES PATENT AND TRADEMARK OFFICE
CERTIFICATE OF CORRECTION

PATENT NO. : 5,787,729           Page 3 of 6
DATED : August 4, 1998
INVENTOR(S) : Wijaya It is certified that error appears in the above-identified patent and that said Letters Patent is hereby corrected as shown below:

edge".

Column 6, line 15, kindly delete "said".

Column 6, line 16, kindly delete "spout member further comprises:".

Column 6, line 17, kindly delete "said"; same line, kindly delete "having" and insert ---- and said second surface of said spout member each have----; same line, kindly delete ";and".

Column 6, line 18, kindly delete "said second surface having a peripheral edge".

Column 6, line 35, after "a can;" kindly insert ---- and ----.

Column 6, line 36, kindly delete "is" and insert ---- being ----.

Column 6, line 39, after "comprises" kindly delete the colon " : "; same line also delete "the paragraph indentation".

Column 6, line 40, after "walls" kindly delete the semi-colon " ; " and insert a comma ---- , ----; same line kindly delete "the paragraph indentation ----.

UNITED STATES PATENT AND TRADEMARK OFFICE
CERTIFICATE OF CORRECTION

PATENT NO. : 5,787,729
DATED : August 4, 1998
INVENTOR(S) : Wijaya

It is certified that error appears in the above-identified patent and that said Letters Patent is hereby corrected as shown below:

Column 6, line 41, kindly delete "is" and insert ---- being ----.

Column 7, line 4, kindly delete "radially aligned" and insert ---- radially-aligned ----;

Column 7, line 7, kindly delete "said spout".

Column 7, line 8, kindly delete "member further comprises:".

Column 7, line 9, kindly delete "having" and insert ---- and said second surface of said spout member each have ----; same line, kindly delete "; and".

Column 7, line 10, kindly delete "said second surface having a peripheral edge".

Column 7, line 11 kindly delete "extends" and insert ---- extending ----.

Column 7, line 14 kindly delete "said second"

Column 7, line 15, kindly delete "spout member further comprises:".

UNITED STATES PATENT AND TRADEMARK OFFICE
CERTIFICATE OF CORRECTION

PATENT NO. : 5,787,729
DATED : August 4, 1998
INVENTOR(S) : Wijaya

It is certified that error appears in the above-identified patent and that said Letters Patent is hereby corrected as shown below:

Column 7, line 16, kindly delete "having" and insert ---- and second surface of said spout member each have ----; same line, kindly delete "; and".

Column 7, line 17, kindly delete "said second surface having a peripheral edge".

Column 7, line 18, kindly delete "extends" and insert ---- extending ----.

Column 8, line 3, after "comprises" kindly delete the semi colon " ; " and insert a colon ---- : ----;

Column 8, line 4 kindly insert ---- an additional paragraph indentation to indicate sub-element ----.

Column 8, line 12, kindly insert ---- an additional paragraph indentation to indicate sub-element ----.

Column 8, line 14, after "member;" kindly insert ---- and ----.

Column 8, line 15, kindly insert ---- an additional paragraph indentation to indicate a sub-element ----; same line kindly delete "radially aligned" and insert ----

UNITED STATES PATENT AND TRADEMARK OFFICE
CERTIFICATE OF CORRECTION

PATENT NO. : 5,787,729
DATED : August 4, 1998
INVENTOR(S) : Wijaya

It is certified that error appears in the above-identified patent and that said Letters Patent is hereby corrected as shown below:

radially-aligned ----.

Column 8, line 23 kindly delete "raidally aligned" and insert ---- radially-aligned ----.

Signed and Sealed this

Third Day of August, 1999

Attest:

Q. TODD DICKINSON

Attesting Officer

Acting Commissioner of Patents and Trademarks